Sept. 29, 1925.

F. G. WITHROW 1,555,091

EMERGENCY BRAKE LEVER ANTIRATTLER

Filed July 13, 1925

Inventor
Floyd G. Withrow
By
Frank E. Liverance, Jr.
Attorney

Patented Sept. 29, 1925.

1,555,091

UNITED STATES PATENT OFFICE.

FLOYD G. WITHROW, OF GRAND RAPIDS, MICHIGAN.

EMERGENCY-BRAKE-LEVER ANTIRATTLER.

Application filed July 13, 1925. Serial No. 43,060.

*To all whom it may concern:*

Be it known that I, FLOYD G. WITHROW, a citizen of the United States of America, residing at Grand Rapids, in the county of Kent and State of Michigan, have invented certain new and useful Improvements in Emergency-Brake-Lever Antirattlers; and I do hereby declare the following to be a full, clear, and exact description of the invention, such as will enable others skilled in the art to which it appertains to make and use the same.

This invention relates to an anti-rattler adapted for application to levers, particularly of the type used with the emergency brake control in certain makes of automobiles of which the Ford automobile is an example.

Levers of this type are equipped with a handle pivotally connected thereto from which a rod depends alongside the lever, said rod at its lower end being connected to a pawl which engages with a toothed sector rigidly attached to the chassis frame of the automobile. It is a primary object and purpose of the present invention to provide a simple device made of wire which will not only act to cause the pawl to remain in engagement with the toothed sector, but which will at the same time hold the parts against aimless movement with respect to each other with a consequent elimination of rattling. A further object of the invention is to provide a device of this character which can be very quickly and easily applied, manufactured at low cost and which in service fully secures all of the benefits and advantages stated, particularly eliminating noise coming from the rattle of the parts which is otherwise liable to occur from road shocks and vibrations in the ordinary running of an automobile.

For an understanding of the invention and the embodiments thereof for the attainment of these ends, reference may be had to the following description taken in connection with the accompanying drawing, in which, Fig. 1 is a perspective view of the upper end of a brake lever showing one form of the anti-rattler construction of my invention applied thereto.

Like reference characters refer to like parts in the different figures of the drawing.

Figure 1:
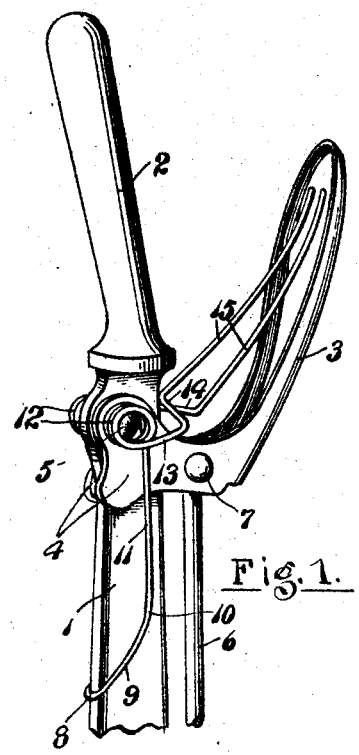

The lever 1 at its upper end is equipped with a rigid hand grip 2. To this lever a handle 3 of sheet metal is connected at one side, the upwardly extending portion of the handle being dished or concaved at its inner side and at its lower ends being turned at an angle to form arms 4 which are pivotally connected to the handle by a pivot pin 5 as shown, it being obvious that the bottom connecting portion between the arms 4 has been removed to permit the location of the handle between them. The rod 6 which leads downwardly to the pawl (previously mentioned but not shown) lies alongside of the lever 1, at its upper end passing between the arms 4 and being secured thereto in any suitable manner as by a rivet or pin or, as is common, by turning the upper end of the rod 6 substantially at right angles to pass through one of the arms 4 and heading over the end of the rod as indicated at 7.

The anti-rattler shown in Fig. 1 is made from a single piece of wire bent midway between its ends to make a loop 8 from which two legs 9 extend for a distance, the same then being bent as indicated at 10 and extending farther, making the spaced apart sides 11 which, with the legs 9, make an obtuse angle, substantially as shown. Each of the sides 11 at its upper end is formed into a spring coil 12 and the ends of said coils are thence extended in two short spaced apart sides 13 which, at their ends, are bent toward and cross each other as indicated at 14, being thence bent substantially at a right angle and terminating in upwardly extending sides 15 which converge somewhat toward each other.

This anti-rattler, when applied to the lever, has its lower loop end fitting over an edge of the lever 1 below the pivot 5, the legs 9 and sides 11 extending upwardly toward the pivot, the coils 12 seating against the arms 4 around the ends of the pivot, the sides 13 extending from the coils to the opposite side of the lever 1 crossing each other and thence extending so that the ends of the sides 15 bear against the handle 3 at its dished or concaved inner side adjacent the upper end thereof.

With a construction as described the ends of the parts 15 bear with yielding pressure against the handle 3, tending to rotate the same in a clockwise direction (referring to Fig. 1) thereby moving the rod 6 downwardly as far as it will go, this being limited by the engagement of the pawl with the notched sector heretofore mentioned. The parts 15 and coils 12 yield when it is desirable to move the handle 3 toward the hand grip 2 so that the pawl may be disengaged but, as soon as free to do so, returns the handle to its outer position, shown in Fig. 1. The parts being under continuous pressure of the spring are held against aimless movement and no rattle occurs, as is evident.

Figure 2:
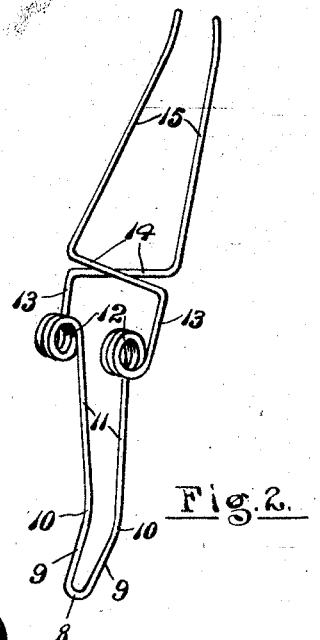
Fig. 2 is a perspective view of the antirattler illustrated as applied to the lever in Fig. 1.
Figure 3:
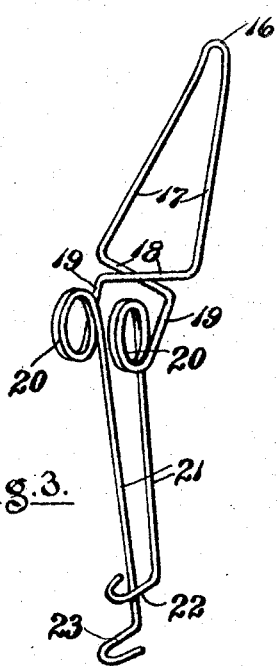
Fig. 3 is a perspective view of a different form of construction of anti-rattler applicable for use in the same relation.
Figure 4:
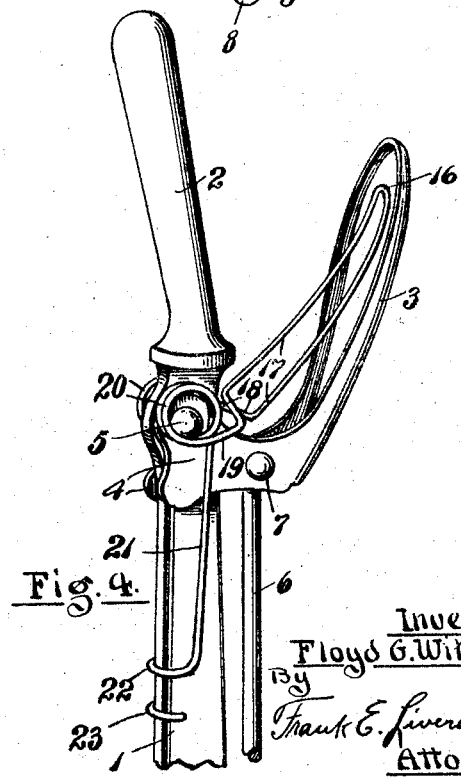
Fig. 4 is a perspective view similar to Fig. 1 showing the different form of anti-rattler illustrated in Fig. 3 applied to the lever.

In Figs. 3 and 4 a somewhat different form of the anti-rattler is shown but equivalent in all respects to the structure shown in Figs. 1 and 2. This form of anti-rattler is also formed from a single piece of wire bent substantially at its middle point and formed into a loop 16 at its upper end, from which diverging sides 17 extend downwardly and inwardly, the same being turned toward each other substantially at right angles at their lower ends to cross each other as indicated at 18, thence being turned again nearly at right angles and making short sections 19 which are formed into spring coils 20, the ends of which extend downwardly, making spaced apart sides 21, which are formed at their lower ends into hooks 22 and 23, respectively, one of the hooks being located in a slightly higher plane than the other.

This construction of anti-rattler, when applied to the lever as shown in Fig. 4, has the loop 16 bearing against the inner dished side of the handle 3. The coils 12 are located around the ends of the pivot 5 the same as before, while the sides 21 extend downwardly along opposite sides of the handle 1 with the hooks 22 and 23 engaging over one edge of the handle. The effect of this form of anti-rattler is precisely the same as that illustrated in Figs. 1 and 2.

These constructions of anti-rattler are simple to apply and when once applied remain securely in position on the handle. Being made from a single piece of wire the cost of manufacture of the same is low. While the invention has been described as to be used in connection with the emergency brake levers of automobiles it is to be understood that there are many other places of use for the same on different types of machines where a lever control is to be used, associated with which is a vertically movable rod operating either a pawl or other device which is to be spring actuated to engage with a notched or toothed sector. The invention is defined in the appended claims and is to be considered as comprehensive of all forms of structure coming within their scope.

I claim:

1. In combination, a lever having a hand grip at its upper end, a handle pivotally connected to the lever below the lower end of the hand grip, and a spring for normally separating said hand grip and handle having one end portion thereof engaging the handle adjacent its outer end and having the other end portion engaging the lever a distance below the pivotal connection of the handle to the lever.

2. In combination, a lever having a hand grip at its upper end, a handle pivotally connected to the lever below the lower end of the hand grip, said handle extending outwardly and upwardly away from the hand grip, and a spring associated with said lever and handle for normally forcing the handle outwardly away from the hand grip, comprising two end portions one engaging the inner side of the handle adjacent its outer end and the other engaging against an edge of the lever a distance below the pivotal connection of the handle to the lever, said spring including coils located between its ends one located at each side of the lever adjacent the pivotal connection of the handle to said lever.

3. In combination, a lever having a hand grip at its upper end, a handle pivotally connected to the lever below the lower end of the hand grip and extending upwardly and outwardly away from said hand grip, and spring means detachably connected to said handle and lever engaging against the lever at one end below the hand grip and against the inner side of the handle at the opposite end normally tending to move the outer end of the handle away from said hand grip.

4. A device of the character described made from a single piece of wire and comprising a central loop and free terminal ends, the sides of said loop and the end portions lying at an angle to each other, and coils formed between the ends of said device in each side thereof substantially at the apex of said angle, substantially as described.

5. A device of the character described made from a single piece of wire comprising a central loop, sides extending therefrom and turned inwardly forming sections crossing each other and thence extended for a short distance and formed into spring coils, the ends of the coils being extended and formed at their ends into terminal hooks, substantially as described.

6. A device of the class described formed from a single piece of spring wire comprising, a central loop and spaced apart sides extending from said loop, said sides terminating in free ends, and said sides being bent toward and crossing each other between their ends and being formed with spring coils near the point where the same cross each other, substantially as described.

7. In combination, a vertical lever having a hand grip at its upper end, a pivotal handle associated therewith, and a spring device adapted to yieldingly force said handle outwardly away from the hand grip and comprising a loop engaging the inner side and upper portion of said handle at one end of said device, and hooks at the opposite end of said device engaging against one edge of the lever below said point of pivotal connection of the handle to the lever, said device being formed with spring coils intermediate its ends located one at each side of the lever and around the ends of the pivot connecting the handle to the lever, substantially as described.

In testimony whereof I affix my signature.

FLOYD G. WITHROW.